United States Patent
Kim

(10) Patent No.: US 10,906,518 B2
(45) Date of Patent: Feb. 2, 2021

(54) RESERVOIR ASSEMBLY FOR BRAKE SYSTEM

(71) Applicant: MANDO CORPORATION, Pyeongtaek-si (KR)

(72) Inventor: Byung Ki Kim, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 15/986,508

(22) Filed: May 22, 2018

(65) Prior Publication Data

US 2018/0345943 A1 Dec. 6, 2018

(51) Int. Cl.
*B60T 11/26* (2006.01)

(52) U.S. Cl.
CPC ..................... *B60T 11/26* (2013.01)

(58) Field of Classification Search
CPC ....................................... B60T 11/26
See application file for complete search history.

(56) References Cited

U.S. PATENT DOCUMENTS

| 6,550,591 B2 * | 4/2003 | Honda | B60T 11/26 188/352 |
| 2006/0038441 A1 * | 2/2006 | Justaman | B60T 11/26 303/115.1 |

FOREIGN PATENT DOCUMENTS

FR 2769275 * 4/1999
JP 2007-76581 * 3/2007

* cited by examiner

*Primary Examiner* — F Daniel Lopez
(74) *Attorney, Agent, or Firm* — Morgan, Lewis & Bockius LLP

(57) ABSTRACT

Disclosed is reservoir assembly for a brake system. The reservoir assembly for a brake system storing brake oil to supply the brake oil to a master cylinder, the reservoir assembly comprising: a first reservoir tank coupled to the master cylinder and having a first connection port at an upper portion; a second reservoir tank provided to be spaced apart from the top portion of the first reservoir tank at a predetermined interval and having an oil inlet at one side and a second connection port at the other side; and a connection member connecting the first connection port with the second connection port to transfer the brake oil from the second reservoir tank to the first reservoir tank.

11 Claims, 5 Drawing Sheets

RESERVOIR ASSEMBLY FOR BRAKE SYSTEM

CROSS-REFERENCE TO RELATED APPLICATION(S)

This application claims the benefit of Korean Patent Application No. 10-2017-0063981, filed on May 24, 2017 in the Korean Intellectual Property Office, the disclosure of which is incorporated herein by reference.

BACKGROUND

1. Field

Embodiments of the present disclosure relate to a reservoir assembly for a brake system, and more particularly, to a reservoir assembly for a brake system easily installed in a limited space.

2. Description of the Related Art

In general, a master cylinder of a brake system for vehicles refers to an apparatus that generates a braking force by transmitting a hydraulic pressure generated by the power of a pedal to a wheel cylinder installed in each wheel. A reservoir storing brake oil is integrally installed at an upper portion of the master cylinder to supply the brake oil to the master cylinder.

In recent years, electronic brake systems that perform various functions and electronically control devices have been used to improve stability of vehicles. In the case of vehicles equipped with such an electronic brake system, it is difficult to package parts in a limited space since parts such as an engine and a transmission and devices such as a motor and a converter are added thereto. Thus, it is difficult to install a conventional master cylinder integrally provided with a reservoir in a limited space of a vehicle due to a restricted shape thereof.

Although a reservoir installed in a master cylinder has been packaged in two or more sub-units, brake oil does not smoothly flow between the separated reservoirs when the brake oil is injected from one reservoir into another. Thus, it is difficult to smoothly supply brake oil to the master cylinder, resulting in occurrence of safety accidents.

SUMMARY

Therefore, it is an aspect of the present disclosure to provide a reservoir assembly for a brake system easily installed in a limited space by dividing the reservoir and having excellent flowability of brake oil.

Additional aspects of the disclosure will be set forth in part in the description which follows and, in part, will be obvious from the description, or may be learned by practice of the disclosure.

In accordance with one aspect of the present invention, there is there is provided a reservoir assembly for a brake system storing brake oil to supply the brake oil to a master cylinder, the reservoir assembly includes a first reservoir tank coupled to the master cylinder and having a first connection port at an upper portion; a second reservoir tank provided to be spaced apart from the top portion of the first reservoir tank at a predetermined interval and having an oil inlet at one side and a second connection port at the other side; and a connection member connecting the first connection port with the second connection port to transfer the brake oil from the second reservoir tank to the first reservoir tank.

Also, the reservoir assembly of claim 1, wherein the first connection port and the second connection port are formed to be inclined.

Also, the reservoir assembly of claim 1, wherein the first connection port is connected to an upper surface of the first reservoir tank.

Also, the reservoir assembly of claim 3, wherein the upper surface of the first reservoir tank is inclined with respect to the first connection port.

Also, the reservoir assembly of claim 1, wherein a barrier wall is provided to partition the inside of the first reservoir tank into a first reservoir chamber and a second reservoir chamber allowing the inside of the first reservoir tank to respectively communicate with first and second pressure chambers of the master cylinder.

Also, the reservoir assembly of claim 5, wherein a passage communicating with the first connection port is formed at an inner upper portion of the first reservoir tank to have an area through which brake oil passes increasing from the second reservoir chamber to the first reservoir chamber.

Also, the reservoir assembly of claim 5, wherein the barrier wall is formed to extend from an inner lower surface of the first reservoir tank toward an inner upper surface thereof but spaced apart from the inner upper surface at a predetermined interval and is bent to have a predetermined angle.

Also, the reservoir assembly of claim 7, wherein the barrier wall is bent toward the first reservoir chamber or the second reservoir chamber.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
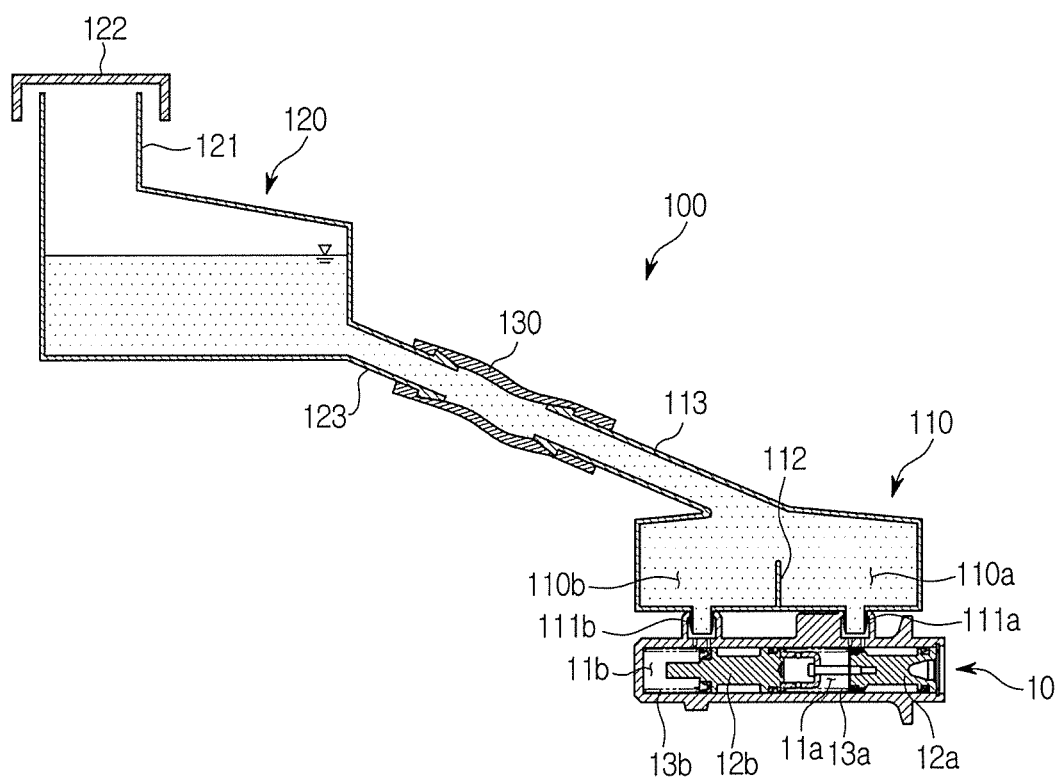
FIG. 1 is a cross-sectional view illustrating a coupled state of a reservoir assembly and a master cylinder used in a brake system according to an embodiment of the present disclosure.

Reference will now be made in detail to the embodiments of the present disclosure, examples of which are illustrated in the accompanying drawings, wherein like reference numerals refer to like elements throughout. The present disclosure may, however, be embodied in many different forms and should not be construed as being limited to the embodiments set forth herein; rather, these embodiments are provided so that this disclosure will be thorough and complete, and will fully convey the concept of the disclosure to those of ordinary skill in the art. The drawings may be exaggerated, omitted, or schematically illustrated for convenience of description and clarity.

Figure 2:
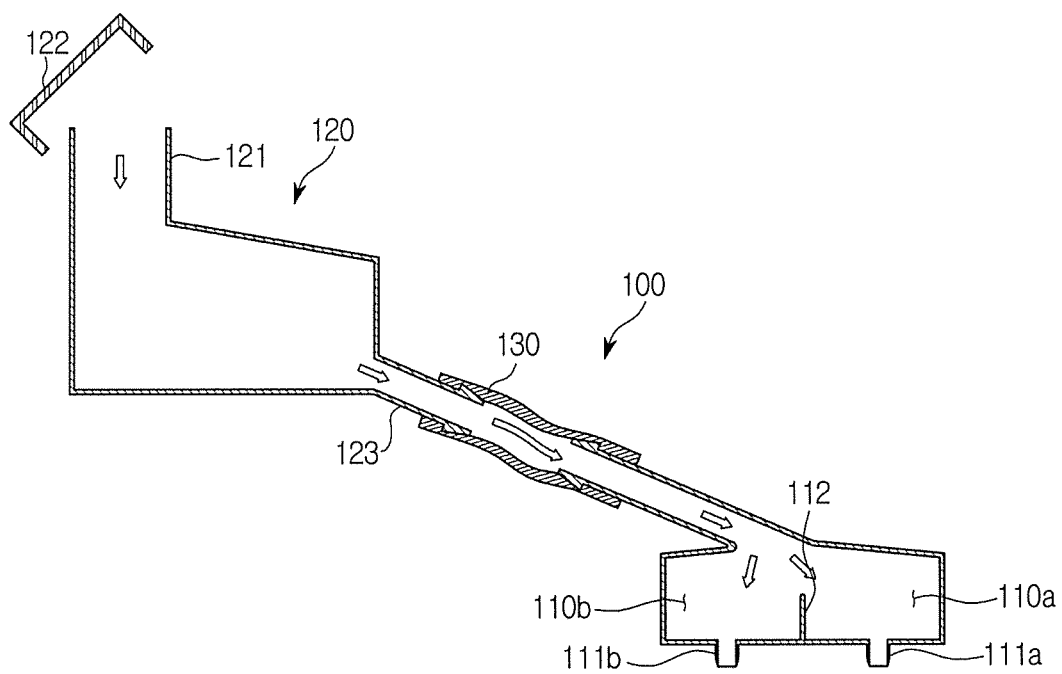
FIG. 2 is a view illustrating a flow direction of brake oil of the reservoir assembly for a brake system according to an embodiment of the present disclosure.
Figure 3:
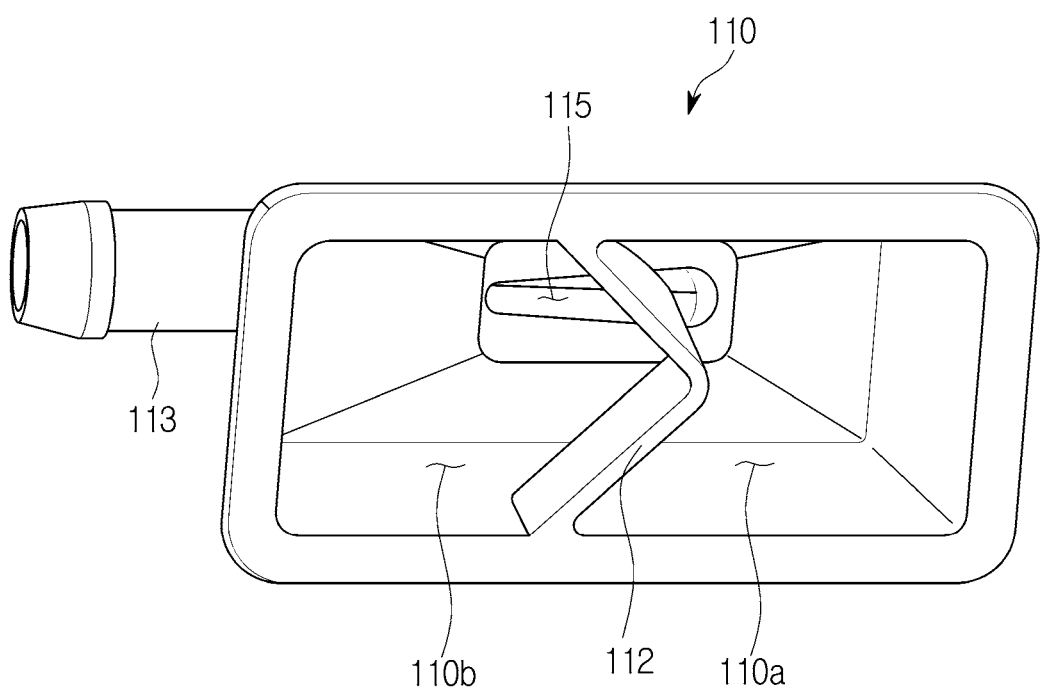
FIG. 3 is a perspective view illustrating the inside of a first reservoir tank provided in the reservoir assembly for a brake system according to an embodiment of the present disclosure.
Figure 4:
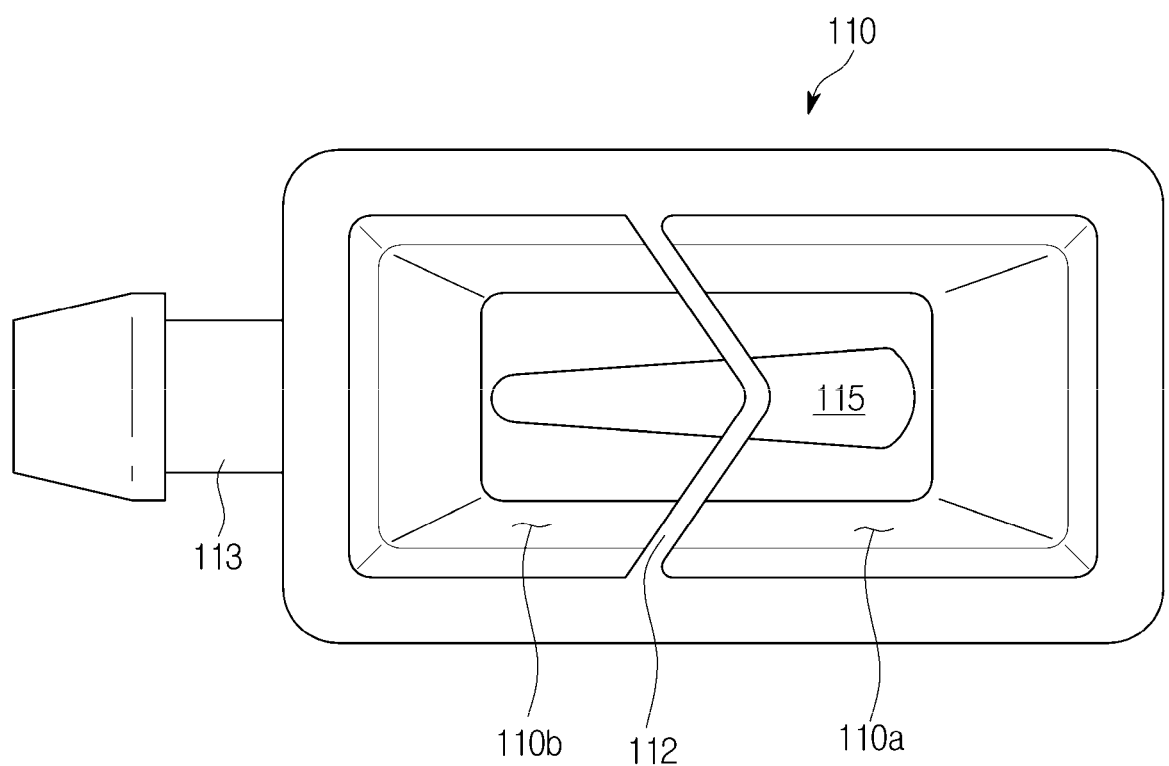
FIG. 4 is a cross-sectional view illustrating a lower portion of the first reservoir tank provided in the reservoir assembly for a brake system according to an embodiment of the present disclosure.

FIG. 1 is a cross-sectional view illustrating a coupled state of a reservoir assembly and a master cylinder used in a brake system according to an embodiment. FIG. 2 is a view illustrating a flow direction of brake oil of the reservoir assembly for a brake system. FIG. 3 is a perspective view illustrating the inside of a first reservoir tank provided in the reservoir assembly for a brake system. FIG. 4 is a cross-sectional view illustrating a lower portion of the first reservoir tank.

Referring to FIGS. 1 to 4, a reservoir assembly 100 for a brake system according to an embodiment includes a first reservoir tank 110 coupled to a master cylinder 10, a second reservoir tank 120 provided to be spaced apart from the first reservoir tank 110 at a predetermined interval, and a connection member 130 connecting the first reservoir tank 110 with the second reservoir tank 120. In this regard, the master cylinder 10 coupled to the first reservoir tank 100 will be briefly described before describing the configuration of the reservoir assembly 100 according to the present disclosure.

In general, the master cylinder 10 may include at least one chamber and generate a hydraulic pressure. As illustrated in the drawings, the master cylinder 10 may include a first pressure chamber 11a and a second pressure chamber 11b. A first piston 12a connected to an input rod (not shown) associated with a brake pedal (not shown) is provided in the first pressure chamber 11a and a second piston 12b is provided in the second pressure chamber 11b. In addition, the first and second pressure chambers 11a and 11b respectively include a first return spring 13a and a second return spring 13b returning the first and second pistons 12a and 12b to original positions thereof, respectively.

The master cylinder 10 is an apparatus supplying a hydraulic pressure to a wheel cylinder (not shown) provided in each wheel of a vehicle by discharging oil using a pressure created when each of the first and second pistons 12a and 12b presses each of the first and second pressure chambers 11a and 11b in accordance with the power of a brake. Since the master cylinder is well-known in the art, detailed descriptions thereof will not be given.

The first reservoir tank 110 has a predetermined space for storing brake oil therein. First and second oil ports 111a and 111b coupled to the master cylinder 10 are provided at lower portions of the first reservoir tank 110 to supply brake oil to the master cylinder 10. That is, the first oil port 111a is coupled to the first pressure chamber 11a to communicate therewith and the second oil port 111b is coupled to the second pressure chamber 11b communicate therewith. Also, a first connection port 113 is provided at an upper portion of the first reservoir tank 110 to receive brake oil from the second reservoir tank 120 which will be described.

The first connection port 113 is integrally formed on the upper surface of the first reservoir tank 110. As illustrated in the drawings, the first connection port 113 may be provided at a central area of the upper surface of the first reservoir tank 110. Here, the position of the first connection port 113 is not limited to the central area of the upper surface of the first reservoir tank 110 and may vary selectively. For example, the first connection port 113 may be located at a left side or a right side of the upper surface with respect to the center of the upper surface of the illustrated first reservoir tank 110. The first connection port 113 is provided to be inclined. That is, the first connection port 113 may be formed to have a predetermined inclination toward the second reservoir tank 120 which will be described later.

In addition, the upper surface of the first reservoir tank 110 has a tapered shape. More particularly, the upper surface of the first reservoir tank 110 is inclined with respect to the portion where the first connection port 113 is formed. This allows viscous brake oil to smoothly flow along a wall of the first reservoir tank 110 when the brake oil is introduced into the first reservoir tank 110 through the first connection port 113.

Figure 5:
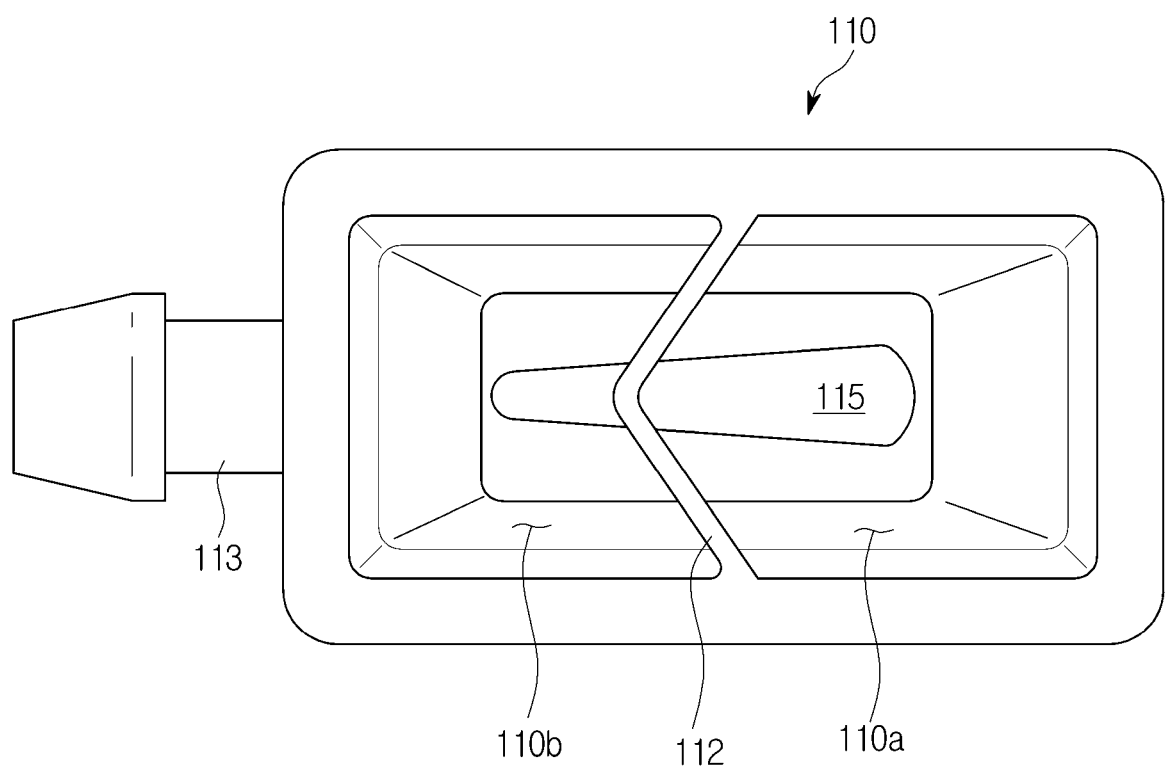
FIG. 5 is a cross-sectional view illustrating a lower portion of the first reservoir tank provided in the reservoir assembly for a brake system according to another embodiment of the present disclosure.

The inside of the first reservoir tank 110 is partitioned into a first reservoir chamber 110a and a second reservoir chamber 110b such that brake oil is supplied respectively to the first pressure chamber 11a and the second pressure chamber 11b when the first reservoir tank 110 is coupled to the master cylinder 10. More particularly, a barrier wall 112 provided in the first reservoir tank 110 may partition the inside of the first reservoir tank 110 into the first and second reservoir chambers 110a and 110b. The barrier wall 112 extends upward from an inner lower surface of the first reservoir tank 110 toward an inner upper surface of the first reservoir tank 110. In this case, however, the barrier wall 112 is formed to be spaced apart from the inner upper surface of the first reservoir tank 110. Also, the barrier wall 112 may be bent to have a predetermined angle. For example, the barrier wall 112 may have an upper surface and a lower surface bent toward the first reservoir chamber 110a or the second reservoir chamber 110b. As illustrated in the drawings, the barrier wall 112 is bent toward the first reservoir chamber 110a. This is to reduce frictional resistance to brake oil by the barrier wall 112 between the first reservoir chamber 110a and the second reservoir chamber 110b. That is, when an amount of brake oil flowing to either the first reservoir chamber or the second reservoir chamber increases, the brake oil may not flow over the barrier wall to the other chamber due to surface tension of the viscous brake oil. Thus, the bent shape may prevent this phenomenon. Accordingly, although the amount of brake oil flowing toward either the first reservoir chamber 110a or the second reservoir chamber 110b increases when the brake oil is introduced into the first reservoir tank 110, the brake oil may flow smoothly from one reservoir chamber with a larger flow amount to the other reservoir chamber with a smaller flow amount due to reduced frictional resistance to the brake oil according to the bent shape of the barrier wall 112. Although the shape of the barrier wall 112 according to an embodiment is illustrated as being bent toward the first reservoir chamber 110a, the shape is not limited thereto. For example, as illustrated in FIG. 5, a barrier wall 112' formed in a first reservoir tank 110' may also be bent toward the second reservoir chamber 110b.

Referring back to FIGS. 1 to 4, a passage 115 communicating the first connection port 113 with the inside of the first reservoir tank 110 is formed at a portion where the first connection port 113 is connected with the first reservoir tank 110. That is, the passage 115 may be formed at the upper surface of the first reservoir tank 110 to have a predetermined length since the first connection port 113 is inclined. As illustrated in the drawings, the passage 115 may be formed such that an area through which brake oil passes increases in a flow direction of the brake oil, i.e., in a direction from the second reservoir chamber 110b to the first reservoir chamber 110a. This is because an amount of brake oil flowing along an inclined upper surface of the second reservoir chamber 110b is greater than that of brake oil flowing along an inclined upper surface of the first reservoir chamber 110a when the viscous brake oil is introduced through the first connection port 113. Thus, since the area of the passage 115 through which brake oil passes becomes larger as the passage 15 is closer to the first reservoir chamber 110a, the brake oil may flow uniformly into the first and second reservoir chambers 110a and 110b. Also, as the area of the passage 115 varies, air inside the first reservoir tank 110 may be easily discharged out through the first connection port 113 when brake oil flows into the first reservoir tank 110. That is, air may be discharged out of the first reservoir tank 110 in the opposite direction of the flow of brake oil shown as an arrow of FIG. 2.

The second reservoir tank 120 has a predetermined space for storing brake oil. More particularly, the second reservoir tank 120 is provided to be spaced apart from the top of the first reservoir tank 110 at a predetermined interval and has an oil inlet 121 at one side and a second connection port 123 at the other side.

The oil inlet 121 is formed at an upper portion of the second reservoir tank 120 and brake oil is introduced thereinto through the oil inlet 121. In this case, a cap 122 is installed at the oil inlet 121 to prevent leakage of the brake oil.

The second connection port 123 is integrally formed at a lower portion of the second reservoir tank 120. As illustrated in the drawings, the second connection port 123 is inclined toward the first reservoir tank 110. This allows brake oil to smoothly flow from the second reservoir tank 120 to the first reservoir tank 110 when the first connection port 113 is connected to the second connection port 123 via the connection member 130 which will be described below.

The connection member 130 connects the first connection port 113 with the second connection port 123 to transfer brake oil from the second reservoir tank 120 to the first reservoir tank 110. The connection member 130 may be formed of a rubber hose for easy transfer of brake oil even when installation positions of the first reservoir tank 110 and the second reservoir tank 120 are changed.

As a result, the reservoir assembly 100 for a brake system may be easily installed in a limited space since the reservoir assembly 100 is divided into the first and second reservoir tanks 110 and 120. Also, flowability of brake oil may be improved therein since air inside the first reservoir tank 110 may be easily discharged while brake oil is injected from the second reservoir tank 120 into the first reservoir tank 110.

As is apparent from the above description, the reservoir assembly for a brake system according to the present disclosure is divided into the first reservoir tank coupled to the master cylinder and the second reservoir tank to supply brake oil to the first reservoir tank, and thus the reservoir assembly may be easily installed in a limited space.

Also, brake oil may be smoothly injected into the divided reservoir tanks due to improved flowability of the brake oil by changing the shapes of the reservoir tanks and the shape of the barrier wall provided in the reservoir tank.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A reservoir assembly for a brake system storing brake oil to supply the brake oil to a master cylinder, the reservoir assembly comprising:
   a reservoir tank having a reservoir chamber at an inside thereof and a connection port at an upper portion thereof to receive the brake oil therethrough, the connection port having an inclination with respect to the upper portion of the reservoir tank,
   wherein a passage, communicating with the reservoir chamber and the connection port, is configured and arranged such that a width of a portion of the passage continuously increases in a flow direction of the brake oil.

2. The reservoir assembly of claim 1, further comprising a barrier wall arranged to partition the inside of the reservoir tank into a first reservoir chamber and a second reservoir chamber.

3. The reservoir assembly of claim 2, wherein the reservoir tank is coupled to the master cylinder, and
   the first reservoir chamber and the second reservoir chamber respectively communicate with first and second pressure chambers of the master cylinder.

4. The reservoir assembly of claim 2, wherein the barrier wall extends from an inner lower surface of the reservoir tank toward an inner upper surface of the reservoir tank.

5. The reservoir assembly of claim 2, wherein the barrier wall is bent toward the first reservoir chamber or the second reservoir chamber.

6. A reservoir assembly for a brake system storing brake oil to supply the brake oil to a master cylinder, the reservoir assembly comprising:
   a first reservoir tank coupled to the master cylinder and having a first connection port at an upper portion thereof, the first connection port having an inclination with respect to the upper portion of the first reservoir tank;
   a second reservoir tank having an oil inlet at one side thereof and a second connection port at another side thereof; and
   a connection member connecting the first connection port to the second connection port to transfer the brake oil of the second reservoir tank to the first reservoir tank,
   wherein a passage, communicating with an inside of the first reservoir tank and the first connection port, is configured and arranged such that a width of a portion of the passage continuously increases in a flow direction of the brake oil.

7. The reservoir assembly of claim 6, further comprising a barrier wall arranged to partition the inside of the first reservoir tank into a first reservoir chamber and a second reservoir chamber.

8. The reservoir assembly of claim 7, wherein the barrier wall extends from an inner lower surface of the first reservoir tank toward an inner upper surface of the first reservoir tank.

9. The reservoir assembly of claim 7, wherein the barrier wall is bent toward the first reservoir chamber or the second reservoir chamber.

10. The reservoir assembly of claim 7, wherein the first reservoir chamber and the second reservoir chamber respectively communicate with first and second pressure chambers of the master cylinder.

11. The reservoir assembly of claim 6, wherein the first reservoir tank and the second reservoir tank are spaced apart from each other at a predetermined interval,
   the first connection port is inclined toward the second reservoir tank, and
   the second connection port is inclined toward the first reservoir tank.

* * * * *

UNITED STATES PATENT AND TRADEMARK OFFICE
CERTIFICATE OF CORRECTION

Page 1 of 1

PATENT NO. : 10,906,518 B2
APPLICATION NO. : 15/986508
DATED : February 2, 2021
INVENTOR(S) : Byung Ki Kim It is certified that error appears in the above-identified patent and that said Letters Patent is hereby corrected as shown below:

On the Title Page

Item (30), should read:
-- (30) Foreign Application Priority Data:
May 24, 2017 (KR) ................................ 10-2017-0063981 --

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*